Figures 1, 2:
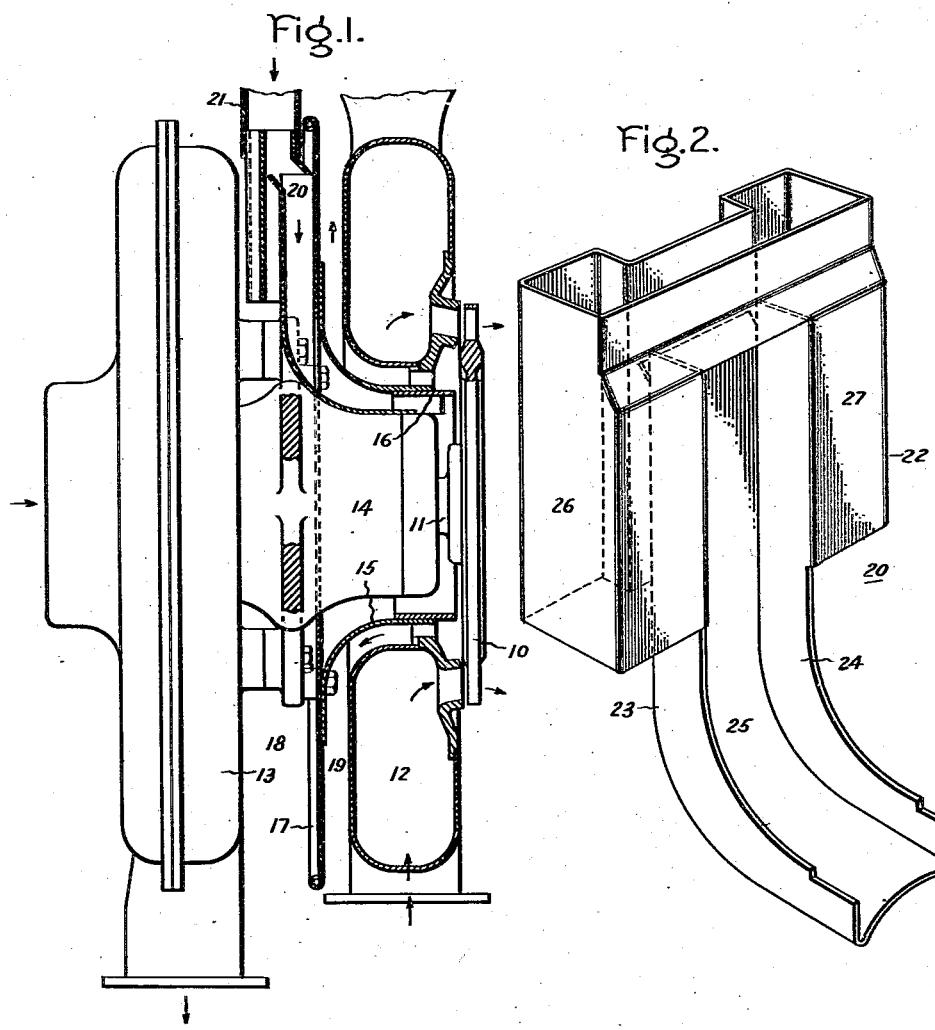

Inventors:
Samuel R. Puffer,
Rollin H. Norris,
by Harry E. Dunham
Their Attorney.

Patented Nov. 13, 1945

2,388,998

UNITED STATES PATENT OFFICE 2,388,998

GAS TURBINE COOLING ARRANGEMENT

Samuel R. Puffer, Lynnfield Center, Mass., and Rollin H. Norris, Schenectady, N. Y., assignors to General Electric Company, a corporation of New York Application September 14, 1939, Serial No. 294,908

4 Claims. (Cl. 60—41)

The present invention relates to gas turbine cooling arrangements for cooling the type of gas turbine which includes a bucket wheel usually supported on an overhung portion of a shaft for driving a supercharger or like apparatus as are used in connection with aircraft power plants and like internal combustion engine plants. The operating gas in these plants is usually supplied from the exhaust manifold of a combustion engine at temperatures of the order of 700° C. and above. These high temperatures cause considerable heating of the bucket wheel and elements adjacent thereto and necessitate the provision of means to keep the temperature of these parts down.

The object of our invention is to provide an improved construction of cooling arrangements for such gas turbines whereby they may be operated safely with gases at high temperature.

For a consideration of what we believe to be novel and our invention, attention is directed to the following description and the claims appended thereto in connection with the accompanying drawing.

Fig. 1 of the drawing illustrates a turbo supercharger for aircraft in accordance with our invention, and Fig. 2 is a perspective view of a part of Fig. 1.

The arrangement comprises a gas turbine having a bucket wheel 10 secured to an overhung portion of a shaft 11. Gases are supplied to the bucket wheel by means including a nozzle box 12 located on one side of the wheel and arranged to receive exhaust gases from an engine, not shown. The shaft 11 in the present instance forms part of a centrifugal type blower or supercharger 13 for supplying compressed air to a combustion engine. The shaft 11 is supported by a bearing 14 located between the bucket wheel 10 and the supercharger 13 and having a right-hand portion in close proximity to and surrounded by the nozzle box 12. During operation, gases are directed by nozzles formed in the box 12 into the spaces formed between the buckets of the wheel 10 to be discharged from the latter directly into the atmosphere. The high temperature of the gases cause considerable heating of the wheel 10 and the bearing 14. In order to keep the temperature of the wheel 10 and the bearing 14 within safe limits, we provide means for reducing radiation from the nozzle box towards the bearing and for directing a stream of air towards the wheel and the bearing.

A curved partition or deflector 15 is disposed between the bearing 14 and the nozzle box 12 and has an inner end portion suitably supported on the bearing and the nozzle box by means including a ring 16. An annular disk 17 is secured to the outer end of the partition 15 to form together with the adjacent parts two annular channels 18 and 19. Means are provided for forcing streams of cooling air through these two channels. This means includes a box-shaped channel structure 20 which has an upper end connected to receive air at high velocity. In the present instance the channel structure 20 has an upper end connected to a conduit 21 which may receive high velocity air from the slip stream of an aircraft or other suitable source not shown. The structure 20 has a box-shaped part or box 22 with partitions 23 and 24. The partitions 23, 24 together with a rear wall portion 25 are extended downward with the extensions curved to conform to the curved portions of the bearing 14 and the aforementioned partition 15. The partitions 23, 24 and the wall 25 and their extensions thus form a channel for directing a portion of the air conducted to the box 22 towards the rear surface of the bucket wheel 10, the end of the curved channel being closely spaced with the rear surface of the bucket wheel 10. The partitions 23, 24 together with wall portions of the box 22 define two other channels 26 and 27 to the left of the partition 23 and to the right of the partition 24 respectively in Fig. 2 for directing streams of air over opposite sides of the bearing 14. Thus the box-shaped channel structure 20 constitutes a device for receiving compressed air or air at high velocity and for directing a portion of the air towards the rear side of the wheel 10 and other portions towards opposite sides of the bearing 14. The portion directed towards the wheel is discharged through the lower portion of the annular channel 19 into the atmosphere. Some of the gases supplied from the nozzle box 12 to the bucket wheel 10 leak through the annular clearance between the nozzle box and the wheel into the channel 19 to be discharged into the atmosphere from the latter. The portion of the cooling air directed by the device toward opposite portions of the bearing is discharged through the annular channel 18 into the atmosphere.

What we claim as new and desire to secure by Letters Patent of the United States, is:

1. The combination of a shaft, a bearing supporting the shaft, a gas turbine having a bucket wheel secured to the shaft on one side of the bearing, a machine driven from the shaft and arranged on the other side of the bearing, means for supplying gases to the bucket wheel including an annular nozzle box surrounding and spaced from the bearing, an annular partition disposed between the bearing and the nozzle box and forming two annular channels therewith, said partition having a cylindrical portion concentrically spaced from the bearing and with an edge closely spaced with the wheel, means including a box-shaped channel structure adjacent the machine and supported on the partition forming channels for directing separate streams of air towards the rear of the bucket wheel and over diametrically opposite sides of the bearing, the cylindrical portion of the partition being adjacent one of the channels to direct the flow of air therethrough toward the wheel.

2. The combination of a machine with a bearing and a shaft having an overhung portion supported on the bearing, a gas turbine having a bucket wheel supported on the overhung portion and an annular nozzle box surrounding and spaced from the bearing for directing gases to the bucket wheel, and means including a channel structure forming a plurality of separate channels and being disposed between the nozzle box and the machine, one of the channels terminating in close proximity to the wheel to direct a stream of air towards the rear surface of the bucket wheel and other channels being arranged to conduct separate streams of air towards diametrically opposite sides of the bearing, the channels having discharge openings in close proximity of the bearing and the wheel respectively.

3. The combination of a shaft, a bearing supporting the shaft, a gas turbine having a bucket wheel secured to the shaft on one side of the bearing and an annular nozzle box surrounding in spaced relation an end portion of the bearing for directing gases to the bucket wheel, a machine having an element secured to the shaft on the other side of the bearing, and means for reducing radiation of heat from the nozzle box towards the bearing and for cooling the wheel, said means including a partition having an outer straight portion and an inner curved portion between the nozzle box and the machine and defining two channels therewith, and a channel structure having a wall defined by the partition and located within one of said channels adjacent the machine with an outer straight portion for receiving cooling air and an inner curved portion having a discharge opening closely spaced with the wheel for directing air towards the wheel, said cooling air being discharged through the channel between the nozzle box and the partition.

4. The combination of a shaft, a bearing supporting the shaft, a gas turbine having a bucket wheel secured to the shaft on one side of the bearing and a nozzle box for conducting gases to the wheel, a machine having an element supported on the shaft on the other side of the bearing, and means to reduce radiation of heat from the nozzle box towards the bearing and the machine, said means including a partition located between the machine and the nozzle box and defining a first channel adjacent the machine and a second channel adjacent the nozzle box, the inner edge of the partition forming a close clearance with the wheel, and a channel structure located substantially within the first channel and having an extension adjacent the bearing and projecting into the second channel, said channel structure forming two passages for conducting separate streams of air towards opposite sides of the bearing and another passage for directing air through the extension towards the wheel.

SAMUEL R. PUFFER.
ROLLIN H. NORRIS.